Aug. 27, 1963  H. L. HOKE  3,101,743
INSIDE REPAIR CLAMP
Filed May 9, 1962  5 Sheets-Sheet 1

INVENTOR.
HOWARD L. HOKE
BY

ATTORNEY.

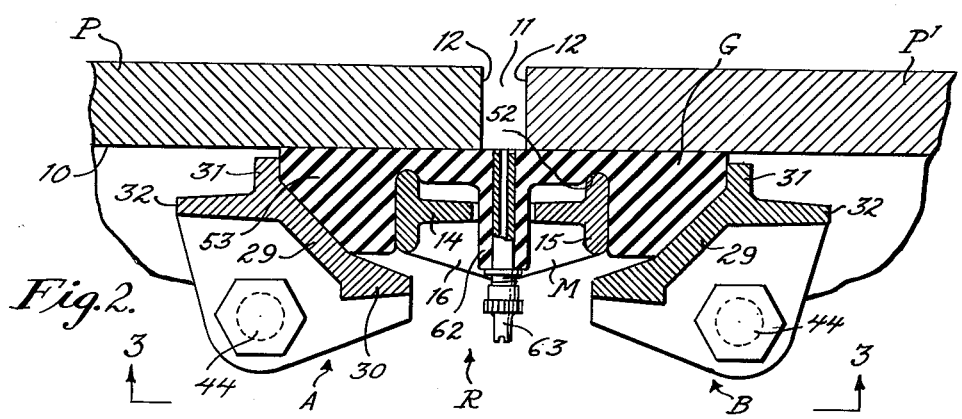
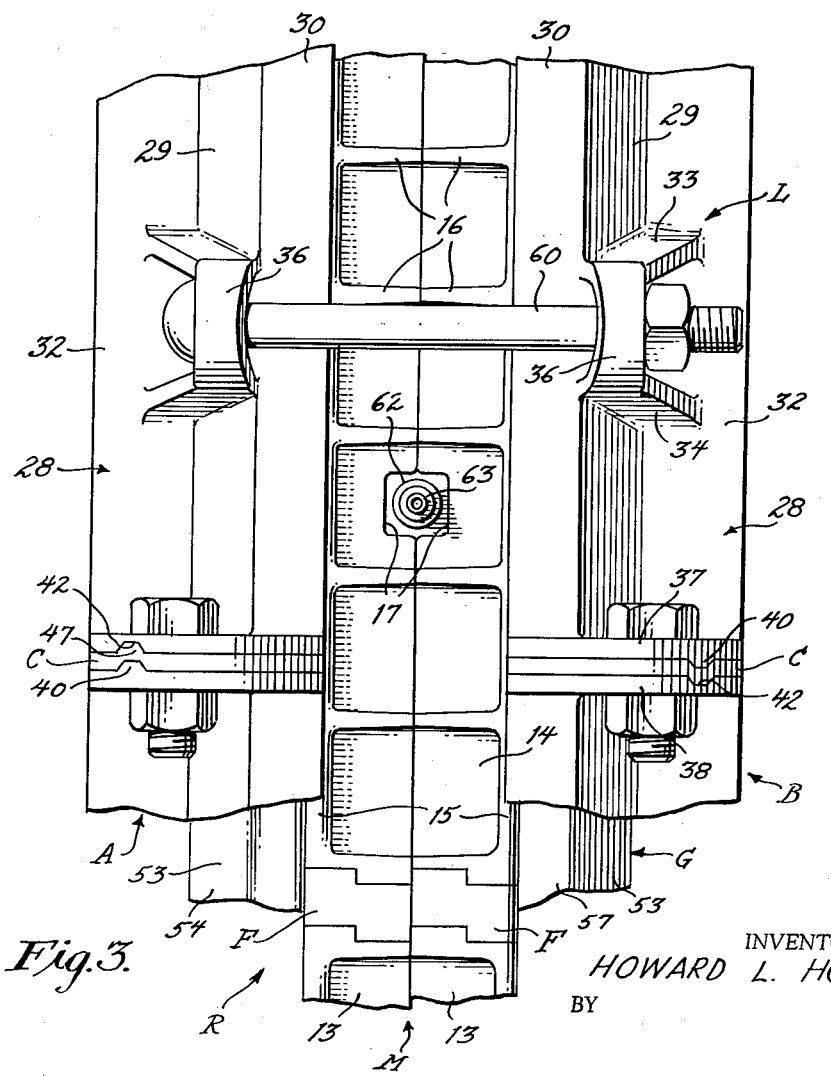

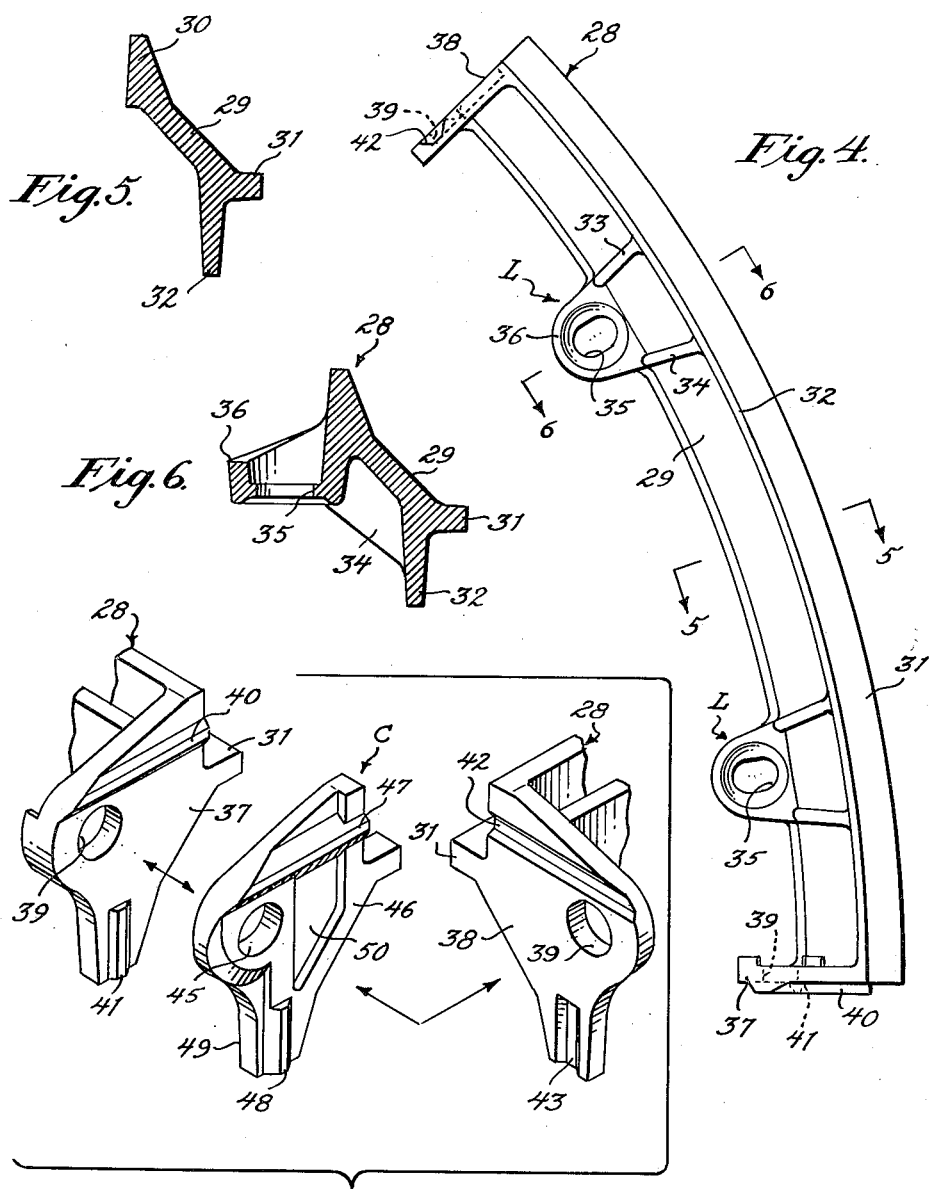

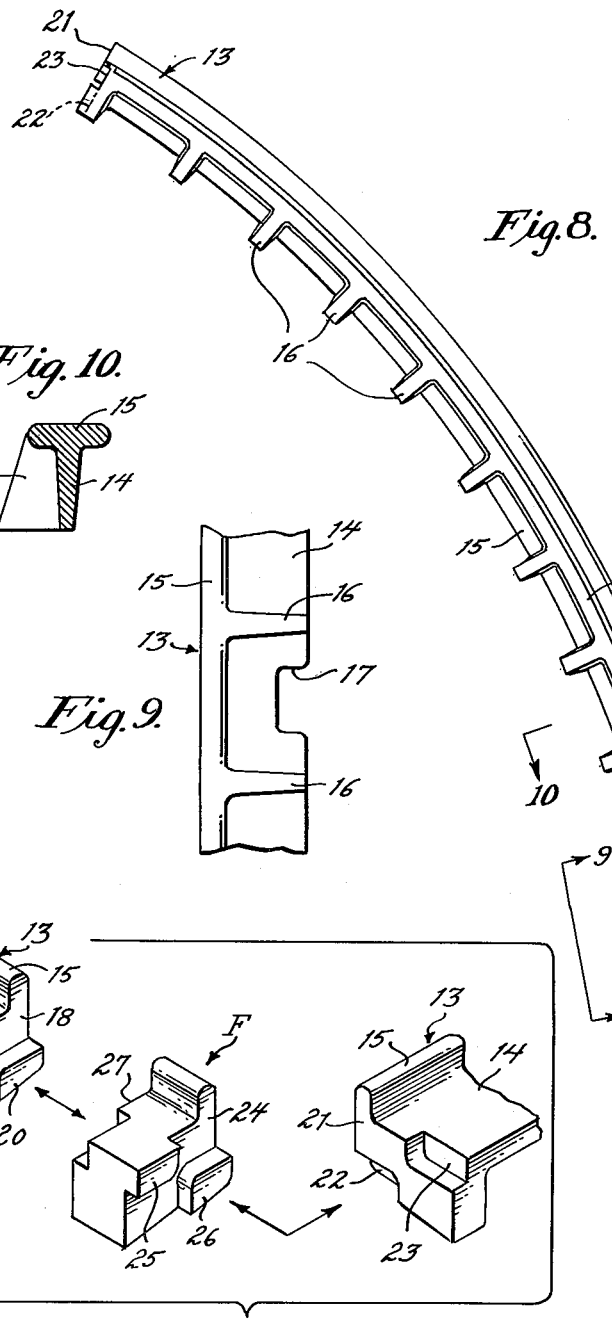

INVENTOR.
HAROLD L. HOKE
BY

ATTORNEY.

3,101,743
INSIDE REPAIR CLAMP
Howard L. Hoke, Bradford, Pa., assignor to Dresser Industries, Inc., Dallas, Tex., a corporation of Delaware
Filed May 9, 1962, Ser. No. 193,470
15 Claims. (Cl. 138—97)

The present invention relates to repair clamps such as are commonly employed when a leak develops at a joint and is concerned primarily with an inside repair clamp for so-called large diameter pipe.

At the present time, it is conventional practice to join two meeting pipe ends with some form of joint. A bell and spigot is typical of one type of joint and a compression coupling is another. In any case when a leak develops at a joint it is necessary to repair the joint to stop the leak. Thus, external bell and spigot repair clamps have been commonly employed. The present invention has in view as its foremost objective, the provision of an inside repair clamp which is characterized as being of a sectional construction whereby it is particularly adapted for use with so-called large diameter pipe, that is, pipe ranging in size from thirty (30) to forty-eight (48) inches in inside diameter.

A further object of the invention is to provide an inside repair clamp of the so-called compression type. That is, it functions on the principle of compressing a gasket longitudinally or axially to cause the gasket to expand against the bore of the pipe and thus create a seal.

A compression type inside repair clamp consists essentially of a middle ring, a pair of followers disposed at the opposite ends of the middle ring and co-operating therewith to provide gasket recesses, a gasket having end portions received in said recesses and bolts for drawing the followers together to compress the gasket longitudinally and cause its radial expansion.

An important object of the present invention is to provide in an inside repair clamp of the type indicated, a middle ring consisting of complemental halves with each half comprising a plurality of arcuate sections which are assembled. A middle ring of this type is particularly adapted to accommodate misalignment of meeting pipe ends which has been a long existing problem and the sectional construction facilitates assembly to size within the bore of a large diameter pipe.

A somewhat more detailed object of the invention is to provide, in an inside repair clamp of the character aforesaid, a middle ring half having arcuate sections with one or more fillers being positioned between the meeting ends of adjacent sections and with the fillers and end faces being mechanically interlocked to maintain the strength and rigidity of the middle ring structure. Another feature is to provide for a staggered relation of the joints of one middle ring half as compared with the joints of the other half.

Another object of the invention is to provide, in an inside repair clamp of the type indicated, a pair of followers with each follower comprising a plurality of arcuate sections. Each section has end flanges at the opposite ends thereof and bolts passed through aligned openings in adjacent end flanges to join the sections together. One or more fillers may be interposed between adjacent end flanges for adjustment and these fillers are mechanically interlocked with the end flanges to incorporate strength and rigidity into the assembled follower.

Another object in view, is to provide an inside repair clamp of the type noted in which the followers are spaced from the outer ends of the middle ring to provide gasket recesses. A highly important object of the invention is to provide a unitary gasket consisting of a comparatively thin central portion which spans the gap between meeting pipe ends and comparatively thickened end portions which are received in the gasket recesses aforesaid.

Still another object of the invention is to provide, in an inside repair clamp of the character indicated, a middle ring and gasket which accommodates an air pressure valve that is provided for test purposes. After a joint has been repaired it is desirable that it be tested to make certain that it is leak proof. Air is introduced by the valve aforesaid to the exterior of the gasket between the pipe ends.

Still another object of the invention is to provide, in an inside repair device of the type noted, a plastic shield that is interposed between the gasket and middle ring about substantially the lower 180 degrees of the joint. The air valve aforesaid is positioned just above this plastic shield.

Various other more detailed objects and advantages of the invention such as arise in connection with carrying out the above noted ideas in a practical embodiment will in part become apparent and in part be hereinafter stated as the description of the invention proceeds.

The invention therefore comprises an inside repair clamp consisting essentially of a two half sectional middle ring including fillers for adjustment, a pair of sectional followers at the opposite ends of the middle ring with each follower including fillers for adjustment and with the followers co-operating with the middle ring to provide gasket recesses, a unitary gasket having thickened portions in said recesses, bolts for drawing the followers together, an air valve for test purposes and a plastic shield interposed between the middle ring and gasket over the lower half thereof.

For full and more complete understanding of the invention reference may be had to the following description and accompanying drawing wherein:

FIGURE 2 is a detailed sectional view taken on an enlarged scale and about on the plane represented by the line 2—2 of FIGURE 1.

FIGURE 3 is an inside elevation taken on the scale of FIGURE 2 and about on the plane represented by the line 3—3 of FIGURE 2.

FIGURE 4 is a view in side elevation of one section of a follower.

FIGURE 5 is a detailed section taken about on the plane represented by the line 5—5 of FIGURE 4.

FIGURE 6 is another detailed section through the follower part of FIGURE 4 being taken about on the plane represented by the line 6—6 of FIGURE 4.

FIGURE 7 is a perspective developing the two end flanges of adjacent follower sections and a filler therebetween in exploded relation.

FIGURE 8 is an elevation of one middle ring section.

FIGURE 9 is a detailed inside elevation of the middle ring part of FIGURE 8 being taken about on the plane represented by the line 9—9 of FIGURE 8.

FIGURE 10 is a detailed section taken about on the plane represented by the line 10—10 of FIGURE 8.

FIGURE 11 is a perspective depicting the two ends of adjacent middle ring sections and the filler therebetween in exploded relation.

FIGURE 4 is a sectional view similar to FIGURE 2 through the lower portion of a repair joint showing the plastic shield and depicting the pipe ends as misaligned.

Figure 1:
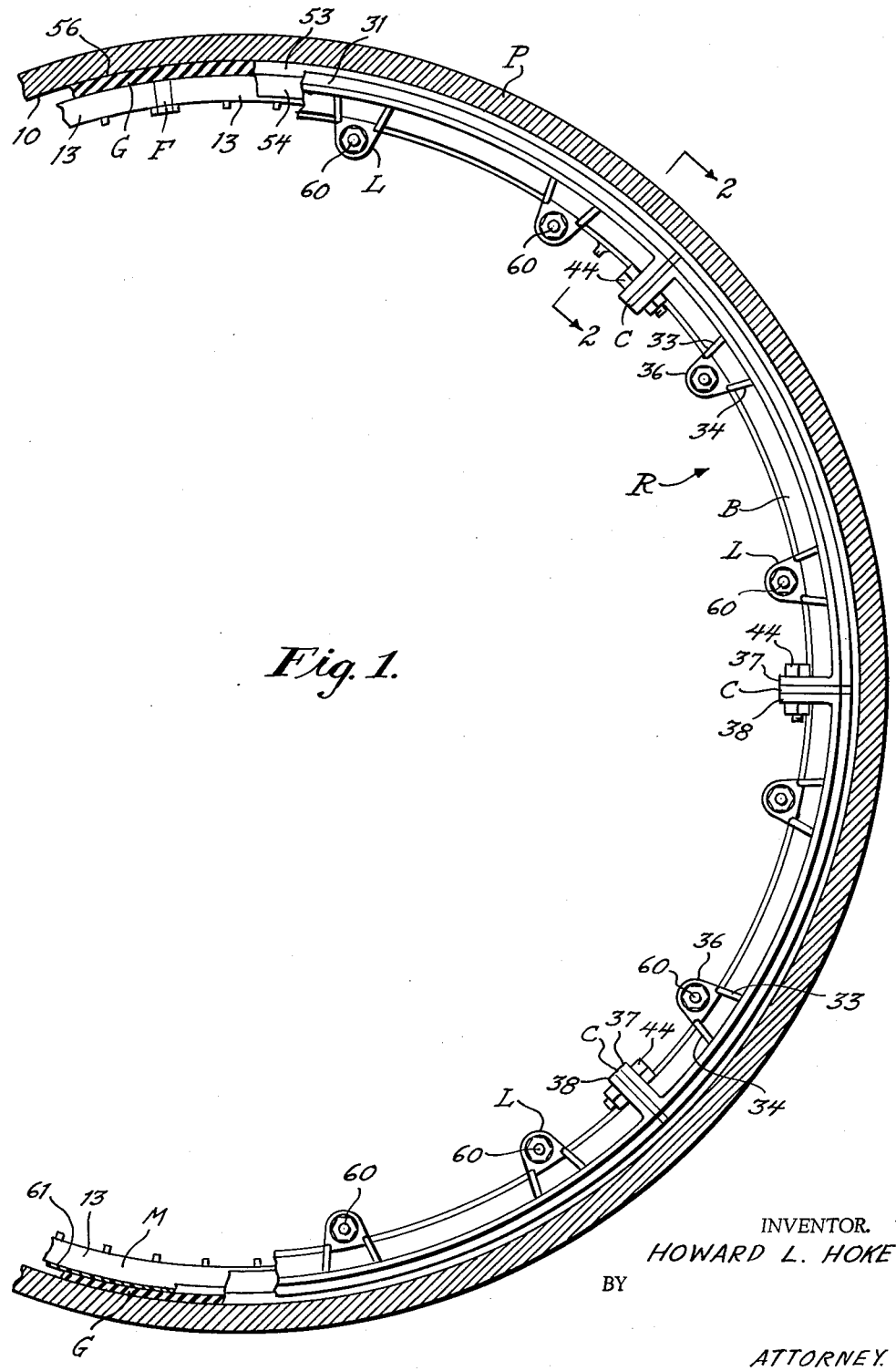
FIGURE 1 is a sectional view through a portion of a pipe adjacent to a joint to which the inside repair clamp of this invention has been applied. Certain parts are broken away and shown in section to more clearly illustrate the details thereof.

Referring now to the drawings wherein like reference characters denote corresponding parts and first more particularly to FIGURE 2, a pair of meeting pipe ends are therein illustrated and designated P and P'. Each of the pipe ends P and P' has a bore 10 and there will ordinarily be a gap 11 betwen end faces 12. It will be understood that some type of pipe coupling is included on the exterior of the pipes P and P' while an inside repair clamp referred to in its entirety by the reference character R is assembled within the bores 10 to stop any leak which might develop in the coupling.

The inside repair clamp R comprises the following: (1) A middle ring, (2) a pair of followers located at opposite ends of the middle ring, (3) a unitary gasket and (4) bolt and nut assemblies for drawing the followers together to compress the gasket longitudinally and cause it to expand into sealing engagement with the bores 10 of the pipes P and P'.

The Middle Ring

The middle ring is referred to in its entirety by the reference charcter M which appears in FIGURES 1 and 2. This middle ring M comprises a plurality of arcuate sections, one of which is shown in FIGURE 8 and designated 13. The number of arcuate sections employed may vary with pipes of different diameters. Thus, the section 13 of FIGURE 8 is approximately sixty (60) degrees and six of these will be required to make up one half of the middle ring. The meeting ends of adjacent sections are either interlocked directly with one another or with fillers to be later described and it is important to note that the joints of one middle ring half are staggered with respect to the joints of the other half. Thus, the joint where two adjacent sections are connected will be located substantially midway of a section of the other half.

Referring now to FIGURES 8 and 10, each middle ring section 13 comprises a central body portion 14 and an outer end flange 15 with the two co-operating to define a T. At spaced intervals webs 16 are integrally joined so that main body portion 14 and the inner part of the flange 15. At an appropriate point, the main body portion 14 is formed with a gap 17 to accommodate an air valve as will be later described. This gap is shown at FIGURE 9. Referring now more particularly to FIGURE 11, one end face of one section 13 is designated 18. This end face is shown as formed with two block-like projections 19 and 20. The adjacent end face of the next section 13 is designated 21 and this face 21 is formed with one recess at 22 which is complemental to the projection 20 which it is adapted to receive and a second recess 23 complemental to the projection 19 which it is adapted to receive.

It will be understood that the end faces 18 and 21 of adjacent sections 13 may be directly connected by simply causing the projections 19 and 20 to be received in the recesses 23 and 22 respectively. However, for purposes of adjustment it will often be necessary to employ one or more fillers, one of which is shown at F in FIGURE 11. Each filler F has a cross section generally corresponding to that of one end of a section 13. It has an end face at 24 which corresponds to the end face 18 and formed with block-like projections 25 and 26 which correspond to the projections 19 and 20 on the end face 18 of one section 13. Its opposite end face at 27 corresponds to the end face 21 and has recesses which correspond to the recesses 22 and 23.

It is evident that the several sections 13 together with one or more fillers F between adjacent ends may be assembled to provide sturdy and rigid middle ring halves which are characterized by the fact that the ends of the adjacent sections are mechanically interlocked either directly or through the fillers F.

The Followers

As shown in FIGURE 2, followers A and B are located at the opposite ends of the middle ring. Except for the fact that these followers are in confronting relation, the two are alike and may be considered as substantially duplicates. Each follower is of a sectional construction comprising a plurality of arcuate sections. The number of sections may vary with pipes of different sizes. In the form of the invention illustrated in the drawings each follower is made up of eight (8) sections with each having an extent of substantially 45 degrees. One such section is illustrated in FIGURES 4 to 7 inclusive.

The follower section of FIGURE 4 is designated 28. It comprises a main body portion 29 that is conical and which terminates on its inner side in a tapered flange 30 that is directed generally axially of the pipe and on its outer side in an angular formation comprising a radial flange 31 and an axial flange 32. At appropriate points spaced from each other and intermediate the ends of each section are lug structures L. In FIGURE 4 to of these lug structures L are illustrated. Each lug structure L is integrally connected to and supported by a pair of webs 33 and 34 which are in turn integrally joined to the conical body portion 29 and axially extending flange 32. Each lug structure L includes a bolthole 35 which is surrounded by bolt housings 36.

Each follower section 28 is formed at one end with a flange 37 and at its other end with a complemental flange 38. The flanges 37 and 38 are formed with aligned boltholes 39 through which pass bolts 44 (FIGURES 1 and 2) which secure adjacent follower sections together. The outer exposed face of the end flange 37 is formed with a projection in the form of a rib 40 and a second projection in the form of a rib 41 that is substantially normal to the rib 40. The exposed face of the end flange 38 of the adjacent section is formed with a groove 42 that is complemental to and adapted to receive the rib 40. Likewise it is formed with a second groove or recess 43 which is normal to the groove 40 and complemental to the rib 41 it is adapted to receive.

It is evident that the end flanges 37 and 38 of adjacent sections may be secured directly together by simply fitting the ribs 40 and 41 in the grooves 42 and 43 respectively and tightening the bolts 44. However, for purposes of adjustment one or more fillers C may be located between adjacent ends of the sections 28. Each filler C has a shape generally corresponding to the end flanges 37 and 38. Thus, each filler C has a bolthole 45 which aligns with the bolthole 39 and which receives one of the bolts 44. One end face such as that designated at 46 corresponds to the end face 37 and has ribs 47 and 48 which correspond to the ribs 40 and 41. The other end face 49 corresponds to the end face 38 and has grooves (not illustrated) corresponding to the grooves 42 and 43.

The filler C is formed with a central cut-out 50 which simply eliminates metal that is not needed. It is evident that with one of more fillers C included between adjacent end flanges and the bolts 44 tightened, a sturdy and rigid construction is afforded by the mechanical interlock of the ribs 40 and 41 being received in the grooves 42 and 43 or the corresponding elements of the fillers.

The Gasket

Upon referring to FIGURE 2, it will be seen that each flange 15 of the middle ring is spaced from the conical body portion 29 of the adjacent follower. Thus, for all effective purposes there is a gasket recess at each end of the middle ring.

The gasket is designated G and is made of rubber or a suitable elastomer material. This gasket is shown in detail in FIGURE 12. It comprises a central or medial portion 51 which spans the gap 11 between the pipe ends P and P' (FIGURE 2). At each end of the central portion 51 there is a rounded corner or groove 52 which receives the outer end edge of a middle ring flange 15. The latter edge is also rounded so that it snugly fits within the groove 52.

Each gasket G includes at its opposite ends, thickened portions 53, there being a thickened portion 53 for each gasket recess.

Each thickened portion 53 is defined by a conical surface 54 which has substantially the same angle as the conical surface 29 of a follower, an outer rounded corner 55, an outer cylindrical surface 56, an inner cylindrical surface 57 and a central radial surface 58 which is connected to the groove 52 by a rounded corner 59.

Figure 12:
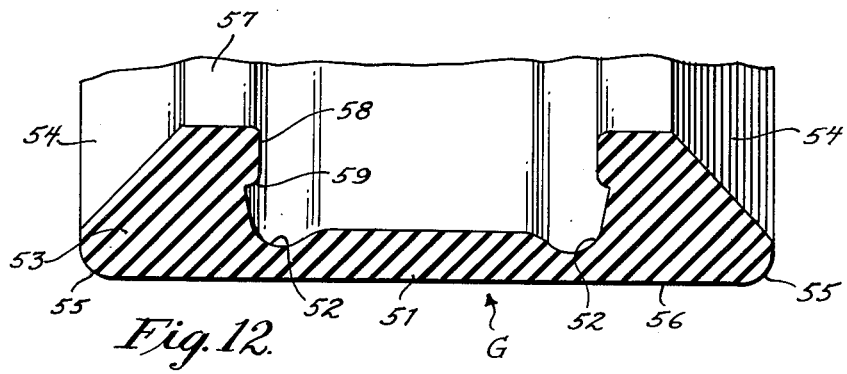
FIGURE 12 is a detailed section through the gasket per se.

This construction of the gasket which is illustrated in FIGURE 12 is that which obtains when the gasket is in its isolated and nondistorted position. After the gasket is assembled with the middle ring and followers and the bolts 60 tightened, it assumes either the position of FIGURE 2 or that of FIGURE 14 or some intermediate position. Generally speaking the rounded corner 59 disappears under compression and the inner radial surface 58 is continued across the end face of the flange 15.

Figure 14:
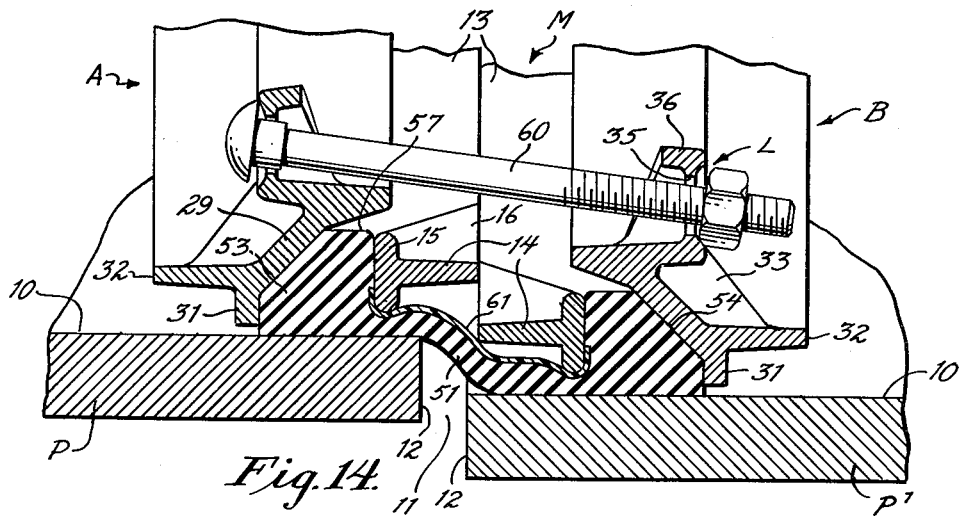
Figure 13:
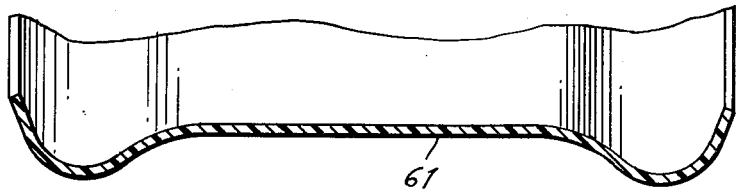
FIGURE 13 is a detailed section through the plastic shield per se.

A plastic shield is shown at FIGURE 13 and designated 61. It may be made of any appropriate plastic having oil resistant properties and has a shape corresponding to the inner contour of the gasket G. It has an extent of substantially 180 degrees and is disposed at the bottom half of the repair device. It is interposed between the middle ring and the gasket as shown in FIGURE 14 and will of course conform to the shape of the gasket as the latter adapts to misaligned pipe ends.

At a point just above the plastic shield 61, the gasket G is formed with a tubular portion 62 (see FIGURE 2) which passes through the gap provided by recesses 17 (FIGURE 9) in the middle ring halves. This tubular portion 62 of the gasket is adapted to receive an air valve 63 for testing purposes.

*Operation*

While the mode of assemblying the repair device in this invention and its operation are believed to be obvious from the illustration of the drawings and description of parts given, they may be briefly outlined as follows:

The gasket G is first positioned in the bores 10 of the pipe ends P and P' with the central portion 51 thereof spanning the gap 11. The two halves of the middle ring are now assembled using a required number of fillers F to afford the proper adjustment. As this is done, the tubular part 62 of the gasket is positioned in the opening provided by the recesses 17. Moreover, the two halves of the middle ring are assembled so that the joints of one half are in staggered relation with respect to those of the other half.

The two followers A and B are now assembled over the thickened end portions 53 of the gasket. As this is done, a required number of the fillers C are embodied between follower sections to afford the required adjustment. The nuts on the bolts 44 are now tightened to complete the follower assembly.

Bolts 60 are now passed through the aligned boltholes 35 of the lug structures L and the nuts on the bolts 60 tightened to cause an axial compression of the end portions 53 of the gasket G. Due to the conical surfaces 29 and 64, this causes the end portions of the gasket to expand into sealing engagement with the bores 10. An air valve 63 may now be applied to the tubular part 62 of the gasket for testing purposes after which it is removed.

While a preferred specific embodiment of the invention is hereinbefore set forth, it is to be clearly understood that the invention is not to be limited to the exact constructions, mechanisms and devices illustrated and described because various modifications of these details may be provided in putting the invention into practice within the purview of the appended claims.

What is claimed is:

1. In an inside repair clamp for a pipe joint, the combination of: a middle ring comprising two complemental sectional halves, a pair of sectional followers with each follower being spaced from an end of said middle ring to provide a gasket recess, a unitary gasket having thickened end portions received in said recesses and bolt and nut assemblies for drawing said followers together to compress said gasket longitudinally and cause its radial expansion.

2. The inside repair clamp defined in claim 1 in which the sections of one middle ring half are staggered with respect to the sections of the other half.

3. In an inside repair clamp for a pipe joint, the combination of: a middle ring comprising two complemental halves with each half consisting of a plurality of arcuate sections having end faces and a filler interlocked between the meeting faces of adjacent sections; a pair of sectional followers with one follower being spaced from an end of said middle ring to provide a gasket recess, a unitary gasket having thickened end portions received in said recesses and nut and bolt assemblies for drawing said follower together to compress said gasket longitudinally and cause its radial expansion.

4. The inside repair clamp defined in claim 3 in which one end face of each arcuate section is formed with a projection and the other end face with a recess corresponding in shape to said projection whereby the recess on one section is adapted to receive the projection on the next adjacent section.

5. The inside repair clamp defined in claim 3 in which on end face of each arcuate section is formed with a pair of block-like projections and the other end face of that section is formed with a pair of recesses corresponding in size, shape and arrangement to the projections on the other end whereby the recesses on the end face of one section are adapted to receive the projections on the end faces of the next adjacent section.

6. An inside repair clamp such as defined in claim 3 in which one end face of each section is formed with a pair of projections and the other end face with a pair of recesses corresponding in size, shape and arrangement to said projections and in which each filler has an end face substantially the same as one end face of an arcuate section and another end face of substantially the same contour as the other end face of that arcuate section.

7. In an inside repair clamp for a pipe joint, the combination of: a middle ring consisting of two complemental sectional halves, a unitary gasket having thickened end portions, a pair of followers with each follower engaging a thickened end of said gasket and bolt and nut assemblies for drawing said followers together, each of said followers comprising a plurality of arcuate sections with each section having an end flange, meeting end flanges of adjacent sections having aligned bolt holes and bolt and nut assemblies passing through said aligned boltholes for securing said follower sections together.

8. An inside repair clamp according to claim 7 in which a filler is interposed between the end flanges of adjacent follower sections and mechanically interlocked therewith.

9. An inside repair clamp according to claim 7 in which the outer face of one end flange of one follower section is formed with a rib and the outer face of the other end flange is formed with a recess complemental to said rib whereby the recess on the end flange of one follower section is adapted to receive the rib on the end flange of the next adjacent follower section.

10. An inside repair clamp according to claim 7 in which the outer face of one end flange of a follower section is provided with a pair of ribs arranged normal to one another and the outer end face of the other end flange is formed with a pair of grooves corresponding in size, shape and arrangement to said ribs whereby the grooves on one end flange are adapted to receive the ribs on the end flange of an adjacent follower section.

11. An inside repair clamp according to claim 7 in which a filler is interposed between the end flanges of adjacent follower sections with the end flange of one section carrying a pair of ribs arranged normal to one another, the meeting face of said filler having grooves receiving said ribs, the other said face of said filler having ribs corresponding in size, shape or arrangement to said ribs on said end flange and the end flange of said other follower section having grooves receiving said ribs on said filler together with a bolt passing through aligned openings in said end flanges and fillers.

12. In an inside repair clamp for a pipe joint the combination of: a middle ring comprising two complemental sectional halves, a pair of sectional followers with each follower being spaced from an end of said middle ring to provide a gasket recess, nut and bolt assemblies for drawing said followers together and a unitary gasket, said gasket comprising a comparatively thin medial portion spanning said pipe joint and thickened end portions integrally joined to said medial portion and received in said gasket recesses.

13. An inside repair clamp according to claim 12 in which each follower and each thickened gasket portion having engaging conical surfaces whereby longitudinal compression of said gasket caused by said bolts drawing said followers together results in radial expansion of said thickened gasket portions.

14. An inside repair clamp according to claim 12 in which a plastic shield having an extent of substantially a semicircle and a shape corresponding to the inner contour of said gasket is interposed between said middle ring and said gasket over the lower half of said joint.

15. An inside repair clamp according to claim 12 in which the gasket includes a tubular portion establishing communication between the interior and exterior thereof with the middle ring halves having a pair of confronting recesses accommodating said tubular portion said tubular portion being adapted to having an air valve applied to the inner end thereof for test purposes.

References Cited in the file of this patent
UNITED STATES PATENTS

| | | |
|---|---|---|
| 831,551 | Guttzeit | Sept. 25, 1906 |
| 1,639,225 | Grace | Aug. 16, 1927 |
| 1,658,043 | Eaglesfield | Feb. 7, 1928 |
| 2,829,910 | Miller | Apr. 8, 1958 |
| 2,896,973 | Wiltse | July 28, 1959 |